No. 741,452. PATENTED OCT. 13, 1903.
L. BROWN.
HORSE HAY RAKE.
APPLICATION FILED MAY 7, 1903.
NO MODEL.
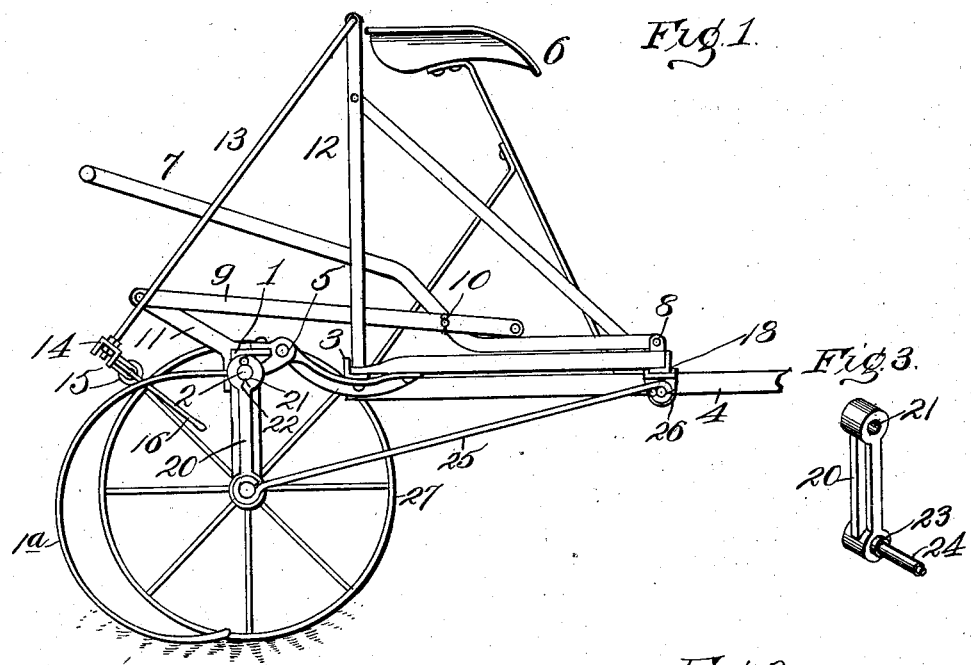
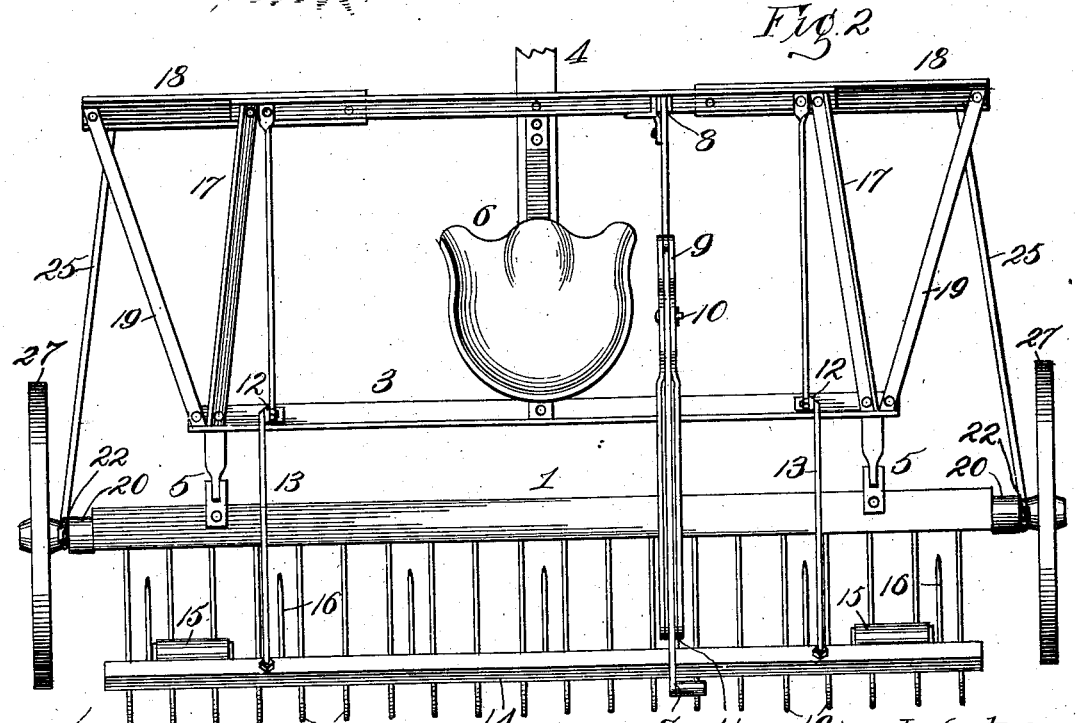
Witnesses: Inventor:
A. McArthur Luther Brown.
H. C. Rodgers. By George F. Thorpe
Atty.

No. 741,452. Patented October 13, 1903.

UNITED STATES PATENT OFFICE.

LUTHER BROWN, OF PLATTE COUNTY, MISSOURI.

HORSE HAY-RAKE.

SPECIFICATION forming part of Letters Patent No. 741,452, dated October 13, 1903.

Application filed May 7, 1903. Serial No. 155,967. (No model.)

*To all whom it may concern:*

Be it known that I, LUTHER BROWN, a citizen of the United States, residing in the county of Platte and State of Missouri, have invented certain new and useful Improvements in Horse Hay-Rakes, of which the following is a specification.

My invention relates to low-wheel horse hay-rakes; and my object is to produce a machine of this character mounted on low wheels in order that the ground under fruit-trees may be properly raked without injury to the trees or the fruit thereon.

A further object is to produce a machine of this character easily and quickly transformable into a high-wheel rake, or vice versa, when desirable.

To these ends the invention consists in certain novel and peculiar features of construction and combinations of parts, as hereinafter described and claimed, and in order that it may be fully understood reference is to be had to the accompanying drawings, in which—

Figure 1 is a side view, with the near wheel omitted, of a hay-rake embodying my invention. Fig. 2 is a top plan view of the rake. Fig. 3 is a detail perspective view of one of the low-wheel-carrying arms.

Referring to the drawings in detail, 1 designates the axle, provided with the customary rake-teeth 1ª and the end spindles 2.

3 is the usual skeleton platform; 4, the tongue underlying the same; 5, the pivotal connection between brackets of the axle and arms of the platform, and 6 the usual seat supported from the platform.

7 is a lever fulcrumed, as at 8, on the front part of frame 3.

9 is a link consisting of parallel bars fitting at opposite sides of lever 7 and pivoted thereto, as at 10, and resting upon the lever at their front ends, the rear ends of the bars forming the links being pivoted to the rear and upper end of an arm 11, projecting rigidly from the axle.

12 designates standards mounted upon the rear part of frame 3, and suitably braced and pivotally connected at their upper ends to standards 12 are link-rods 13, carrying a crossbar 14 at their lower ends equipped with rollers 15 to rest upon proximate teeth 1ª and with arms 16 to reliably strip the hay from the rake as the latter is raised to inoperative position in any suitable or preferred manner, it being understood in this connection that all of the parts thus far described may be of the type shown or of any other suitable or preferred type.

The usual rake also embraces a pair of wheels (not shown) journaled upon the spindles 2 in the customary manner, which wheels materially interfere with the operation of the rake under fruit or other low trees. In lieu of such wheels, therefore, I have equipped the rake with low wheels and have made other changes, so as to adapt the machine for the proper operation of said wheels—that is to say, outward of the end bars 17 of the platform described I have equipped the front bar of said frame with rigid extensions 18 and have braced such extensions from the rear bar of the platform by means of the forwardly-diverging braces 19.

A pair of arms 20 are provided at their upper ends with holes 21 to form journals for the spindles 2, and said arms are secured upon said spindles by means of spring-cotters 22 or their equivalents. At their front ends said arms are provided with outwardly-projecting stub-shafts, consisting of parts 23 and the smaller parts or spindles 24, and the arms are braced by means of braces 25, which encircle parts 23 and are bolted at their front ends to brackets 26, depending from frame extensions 18, which frame extensions, as will be readily understood, are provided in order that braces 25 shall extend approximately parallel with the line of travel, and thus more effectually brace the arms 20 and keep them from twisting and throwing out of alinement the axes of the low wheels 27, journaled on said spindles 24 and held thereon in any suitable or preferred manner.

From the above description it will be apparent that the axle is free to turn in arms 20 for the purpose of raising or lowering the rake-teeth, which rotatable action of the axle does not affect the upright position of said arms.

When desired, this rake can be quickly and easily transformed into an ordinary high-wheel rake by removing wheels 27, arms 20, braces 25, frame extensions 18, and braces 19 and securing upon spindles 2 in the customary manner the high wheels.

It will thus be seen that I have produced attachments whereby an ordinary high-wheel rake can be transformed into a low-wheel rake for use under orchard trees and the like, which can be easily and quickly secured in or removed from position, and which are of simple, strong, durable, and cheap construction.

Having thus described the invention, what I claim as new, and desire to secure by Letters Patent, is—

1. A horse hay-rake, comprising an oscillatory axle, having rearwardly-projecting rake-teeth, a platform connected to said axle, arms forming journals for the ends of the axle, wheels journaled on said arms below the axle, lateral extensions for said platform, and braces connecting the lower ends of said arms with said lateral extensions.

2. A horse hay-rake, comprising an oscillatory axle having rearwardly-projecting rake-teeth, a platform connected to said axle and having lateral extensions at its front ends, arms forming journals at their upper ends for said axle, and provided with outwardly-projecting portions at their lower ends, wheels journaled on said outwardly-projecting portions, and braces secured on the outwardly-projecting portions of said arms at the inner sides of the wheels and to the said platform extensions.

In testimony whereof I affix my signature in the presence of two witnesses.

LUTHER BROWN.

Witnesses:
S. H. KIMBALL,
E. C. HARRIS.